(12) United States Patent
Aceves

(10) Patent No.: US 6,759,947 B2
(45) Date of Patent: Jul. 6, 2004

(54) MOVING VEHICLE COMFORT, SECURITY AND SAFETY SIGNALING SYSTEM

(76) Inventor: Manuel Aceves, 613 Arcadia Ter. Apt. 203, Sunnyvale, CA (US) 94086

( * ) Notice: Subject to any disclaimer, the term of this patent is extended or adjusted under 35 U.S.C. 154(b) by 50 days.

(21) Appl. No.: 10/137,940

(22) Filed: May 2, 2002

(65) Prior Publication Data

US 2003/0206097 A1 Nov. 6, 2003

(51) Int. Cl.[7] .................................................. B62J 6/00
(52) U.S. Cl. ........................ 340/432; 340/468; 362/473
(58) Field of Search ................................ 340/432, 464, 340/468, 471, 472, 473, 475; 362/473, 545, 252, 396

(56) References Cited

U.S. PATENT DOCUMENTS

| | | | | | |
|---|---|---|---|---|---|
| 4,099,159 | A | * | 7/1978 | Windisch | 340/432 |
| 4,204,191 | A | * | 5/1980 | Daniels | 340/432 |
| 4,819,135 | A | * | 4/1989 | Padilla et al. | 362/473 |
| 5,617,303 | A | * | 4/1997 | Izzo, Sr. | 362/473 |
| 5,871,269 | A | * | 2/1999 | Chien | 362/474 |
| 5,933,076 | A | * | 8/1999 | Babb | 340/475 |
| 6,018,295 | A | * | 1/2000 | Jewell et al. | 340/468 |

* cited by examiner

Primary Examiner—Nina Tong
(74) Attorney, Agent, or Firm—Steins & Associates, P.C.

(57) ABSTRACT

A Moving Vehicle Comfort, Security and Safety Signaling System is disclosed. The system may be available as a kit for installation on a conventional vehicle, or it may be integrated into the vehicle (e.g. within a bicycle frame). The system further includes an improved lighted indicator assembly to provide other vehicles and pedestrians with additional information regarding the driver/rider's intentions. The system may be voice-activated or activated by manual switches, or both. The system may further include an anti-theft device for detecting if the vehicle is jostled. Furthermore, the system, when configured for a bicycle, may include a water misting system for dispensing fine water spray onto the rider's face area. A kit for installation on existing bicycles utilizes flat circuit tape for interconnecting the electrical components.

20 Claims, 11 Drawing Sheets t1
STATUS=
LEFT TURN t2 t3 t4 t5 t6 t7 t8

REPEAT t1-t8
UNTIL STATUS =
END LEFT TURN t1
STATUS = NORMAL
(SCANNING)

t2 t3 t4 t5 t6 t7 t8

REVERSE (t8 - t1)
AND REPEAT REVERSE
UNTIL STATUS =
END NORMAL

MOVING VEHICLE COMFORT, SECURITY AND SAFETY SIGNALING SYSTEM

BACKGROUND OF THE INVENTION

1. Field of the Invention

This invention relates generally to vehicle warning systems and, more specifically, to a Moving Vehicle Comfort, Security and Safety Signaling System

2. Description of Related Art

Bicycles are a supremely versatile mode of transportation. Not only are they capable of providing very rapid transit in urban areas, but they also provide a means for exercising while still being able to enjoy your surroundings. In fact, in many countries around the world, bicycles are the primary mode of personal transportation in urban locations.

Of course, any time a bicyclist is transiting on roads (versus off-road), he or she is sharing the road with motorized vehicles such as cars and trucks and the like. Due to the relative difference in size between the bicyclist and the motor vehicle, it is a substantial hazard that the bicyclist will be struck by a motor vehicle.

In recognition of these hazards, bicycle lighting systems have evolved. One common design is depicted in FIG. 1. FIG. 1 is a side view of a conventional bicycle 10 and cycle lighting system 12. In its conventional form, the system includes a headlight assembly 14, which is designed to provide illumination of the area in front of the bicycle 10 when the rider is operating the bicycle 10 after dark. Also included in the system 12 is typically a tail light assembly 16 for warning vehicles approaching from behind the bicycle 10 of its presence.

The lights 14 and 16 are powered electrically either from a battery pack located within one of the two light housings 14 or 16, or else by a generator 18 positioned to be driven by the tire 20 of the bicycle 10 when the bicycle 10 is in motion. Connecting all of the aforementioned components together is a plurality of wiring leads 22 attached to the frame 24 in some way (usually by cable ties or adhesive rings).

If we now turn to FIGS. 2A and 2B, we can examine further detail regarding the prior art. FIGS. 2A and 2B are front views of two conventional cycle tail light assemblies 16A and 16B, respectively. In FIG. 2A, we can see that one design for a conventional tail light assembly 16A has a housing 28A, from which protrudes a plurality of lights, such as the left and right turn indicator lights 30 and 32, and possibly a warning/brake indicator light 34. Typically, these lights 30–34 are operated by a switch positioned on the handlebars of the bicycle. As shown in FIG. 2B, another conventional design for a bicycle tail light 16B is simply a housing 28B and a strobe warning light 36. The warning light 36 essentially either just flashes on and off rapidly in a strobe fashion, or it will scan (one or the other). Its purpose is to notify operators of vehicles approaching from the rear of the cyclists presence; no other information can be communicated by the user of this warning light system.

All of these conventional lighting features have substantial safety defects. Specifically, the headlight 14 shown in FIG. 1, is fairly well-suited (only) for illumination of the road ahead, however, because it is easily lost in background lighting, it is very unsuitable to alert pedestrians and vehicle operators of the presence of the cyclist, nor can it be used to telegraph the rider's intention. Regarding the tail light assemblies 16, these too can be difficult to see since they do not provide any action or activity that might attract a vehicle operator's attention. It would be very beneficial if the lighting system was substantially more noticeable to others when the rider is simply riding along; it would be even more beneficial if the lighting system provided the cyclist with a way to display further information regarding his or her intentions (such as to turn or stop) in a way that was more noticeable and intuitively communicative than the prior systems.

SUMMARY OF THE INVENTION

In light of the aforementioned problems associated with the prior devices and systems, it is an object of the present invention to provide a Moving Vehicle Comfort, Security and Safety Signaling System. The system should be available as a kit for installation on a conventional vehicle, or it may be integrated into the vehicle (e.g. within a bicycle frame). It is a further object that the system include an improved lighted indicator assembly to provide other vehicles and pedestrians with additional information regarding the driver/rider's intentions. The system should be voice-activated or activated by manual switches, or both. It is yet another object that the system include an anti-theft device for detecting if the vehicle is jostled. It is another object that the system, when configured for a bicycle, include a water misting system for dispensing fine water spray onto the rider's face area. A kit for installation on existing bicycles should utilize circuit tape for interconnecting the electrical components.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Moving Vehicle Comfort, Security and Safety Signaling System.

Figure 1:
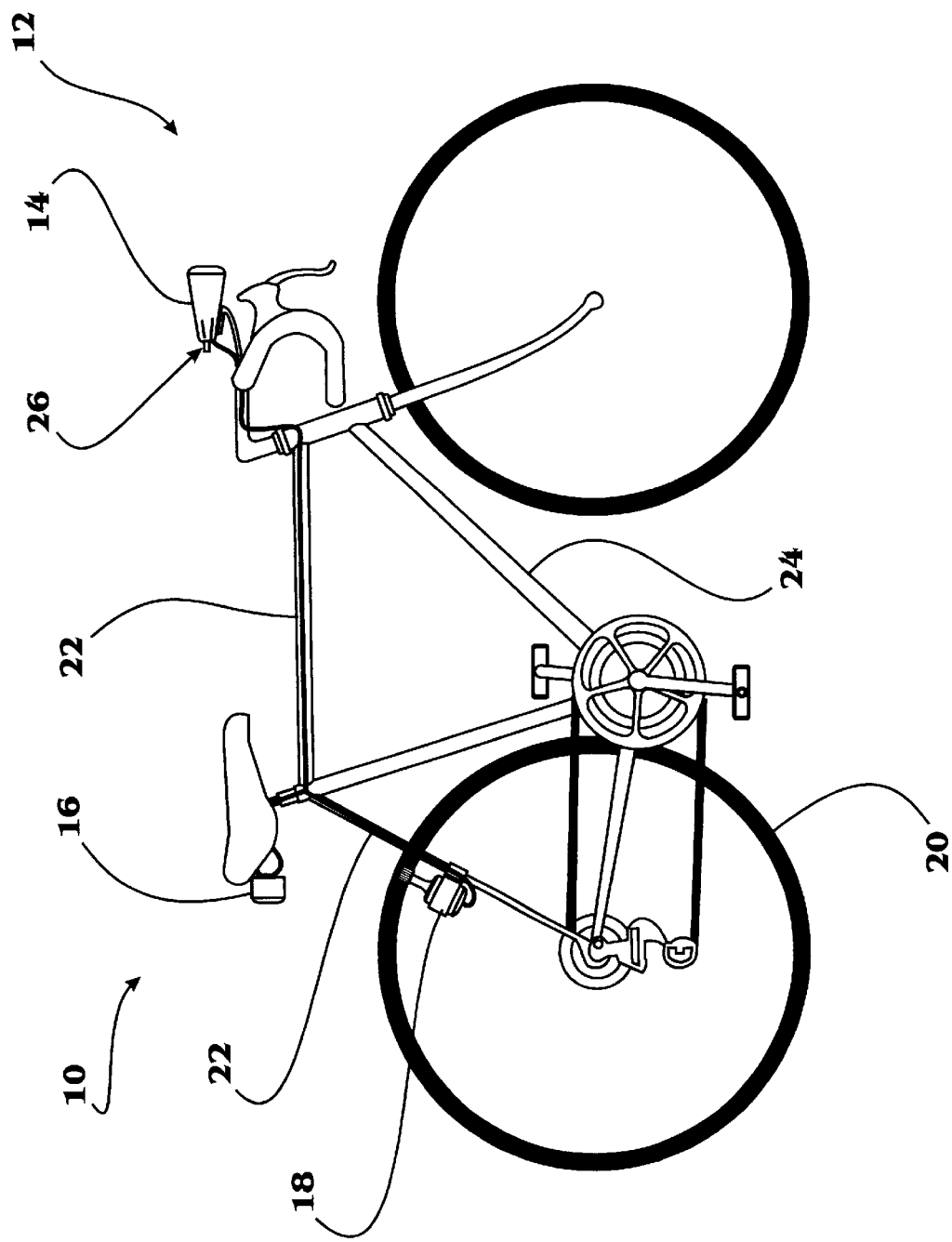
FIG. 1 is a side view of a conventional bicycle and cycle lighting system.
Figure 2A:
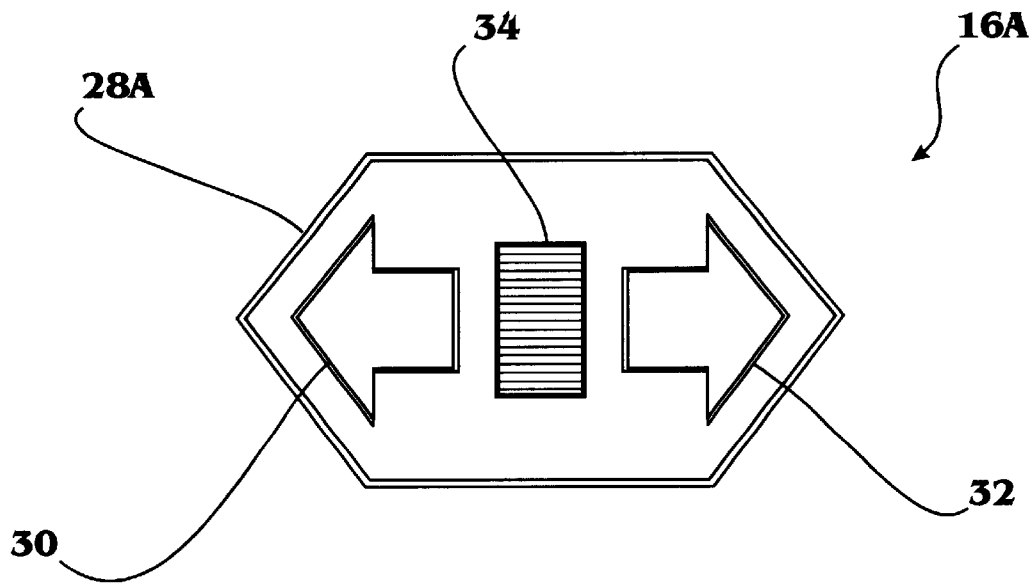
FIGS. 2A and 2B are front views of two conventional cycle tail light assemblies.
Figure 2B:
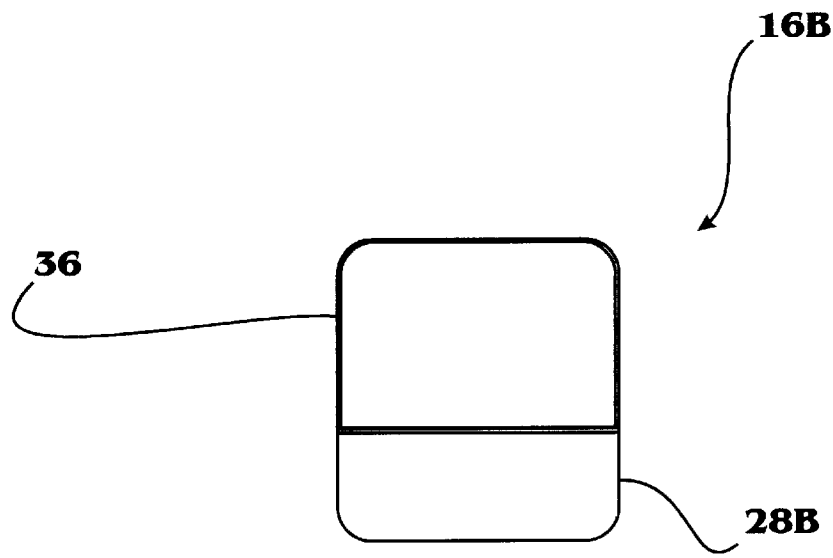
Figure 3:
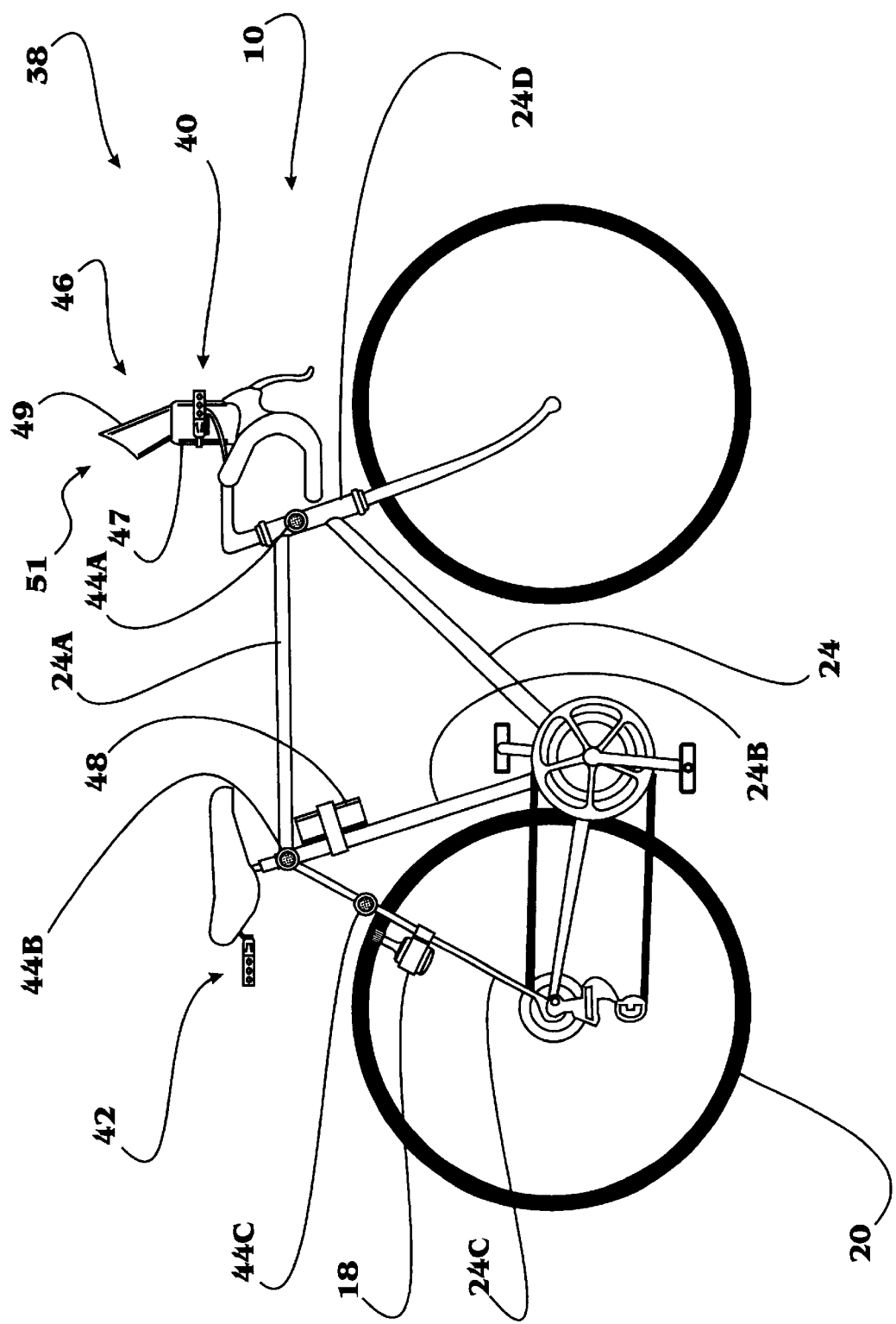
FIG. 3 is a side view of a bicycle with an embodiment of the integrated Vehicle Safety and Comfort System of the present invention.

The present invention can best be understood by initial consideration of FIG. 3. FIG. 3 is a side view of a bicycle 10 with an embodiment of the integrated Vehicle Safety and Comfort System 38 of the present invention. In its depicted form, the system 38 comprises a front light array assembly 40 and tail light array assembly 42 attached to the front and rear of the cycle, respectively. The features and operation of these assemblies 40 and 42 will be discussed in more detail below in connection with FIGS. 7–9.

The system 38 also comprises three or more side lights 44, such as in the positions depicted by the first right side light 44a, the second right side light 44b, and the third right side light 44c. It should be understood that a matching set of side lights will be displayed on the left side of the cycle. The features and operation of these side lights 44 will be discussed in more detail below in connection with FIGS. 4–6 and 10. The side lights 44 will preferably be disbursed over the length of the frame 24 of the bicycle 10. Here, we can see that the first right side light 44a is located on the head tube 24D; the second right side light 44b is located on the top tube 24A, at its junction with the seat tube 24B; the third right side light 44c is located on the (right side) seat stay 24C.

The lights 40, 42 and 44 are controlled in their operation by the control unit 48, which may be attached to the seat tube 24B. The entire system 38 is powered by a generator 18 and/or by a battery (not shown, but would be enclosed in the control unit 48). Also included in the control unit 48 might be a motion sensing switch (not shown). This switch would consist of a conventional motion sensor, such as a "mercury switch" that detects when the cycle is moved off of its kick-stand ("righted"), which would activate an audible alarm (the components of which would be enclosed within the control unit 48). The device could be selectively armed when the cycle is rested in the kick-stand (if the user chose to have the alarm arm at this time). In one embodiment, when the alarm is activated, the user must use a key or remote control to turn the alarm off.

A further advancement in rider comfort provided by the present invention is the misting system 46. The misting system 46 preferably comprises a reservoir 47 for water (and ice, if desired), a cowl 49 for directing water mist towards the face of the rider, and an electric water pump 51 located at the bottom of the reservoir 47; the pump 51 will force water through a nozzle, thereby creating the water mist.

The operation of the lights 40, 42 and 44 and misting system 46 may be controlled in different ways, depending upon the particular application of the system 38. In particular, while manual switches might be provided for operating the different devices, in some embodiments, voice activation of the system 38 may also be available. We will now turn to FIG. 4 to begin to discuss the different lighting modes available in this unique system 38.

Figure 4:
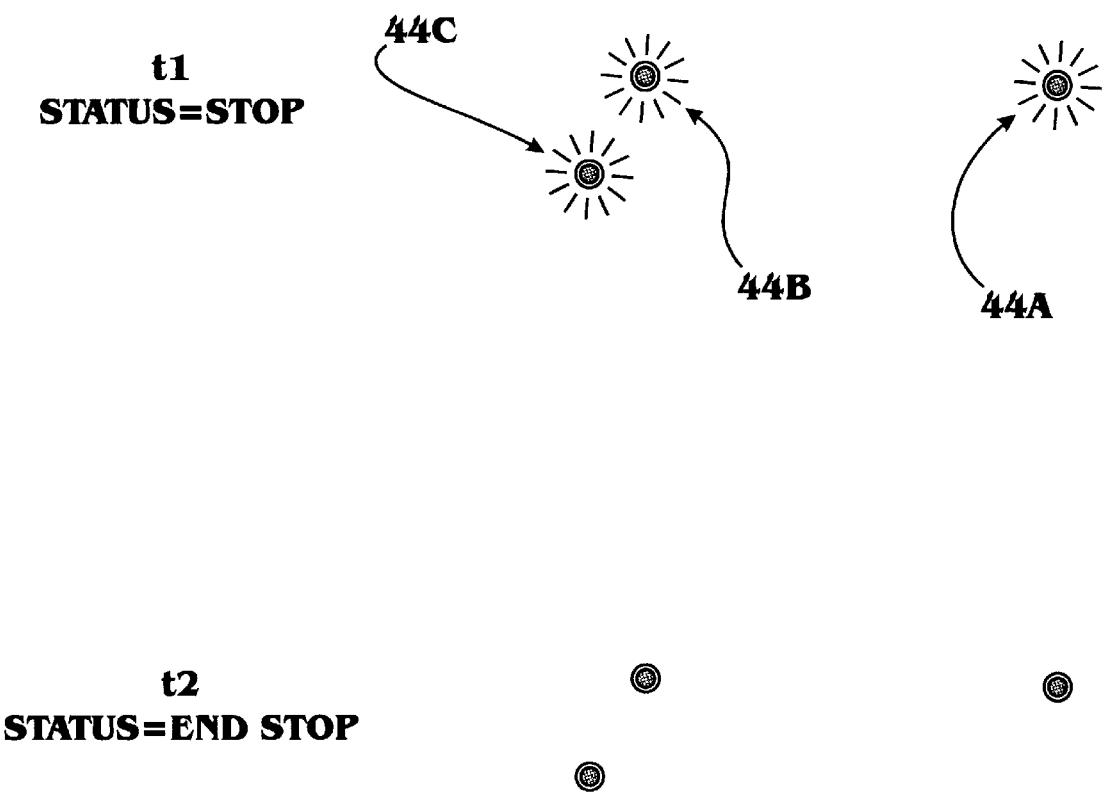
FIG. 4 is a depiction of the side light operation in "Stop" mode.

FIG. 4 is a depiction of the side light 44 operation in "Stop"mode. In this depiction (and those below in FIGS. 5 and 6), three side lights are shown; it should be understood that the system may comprise either more or fewer side lights 44, depending upon the particular application involved.

Figure 5:
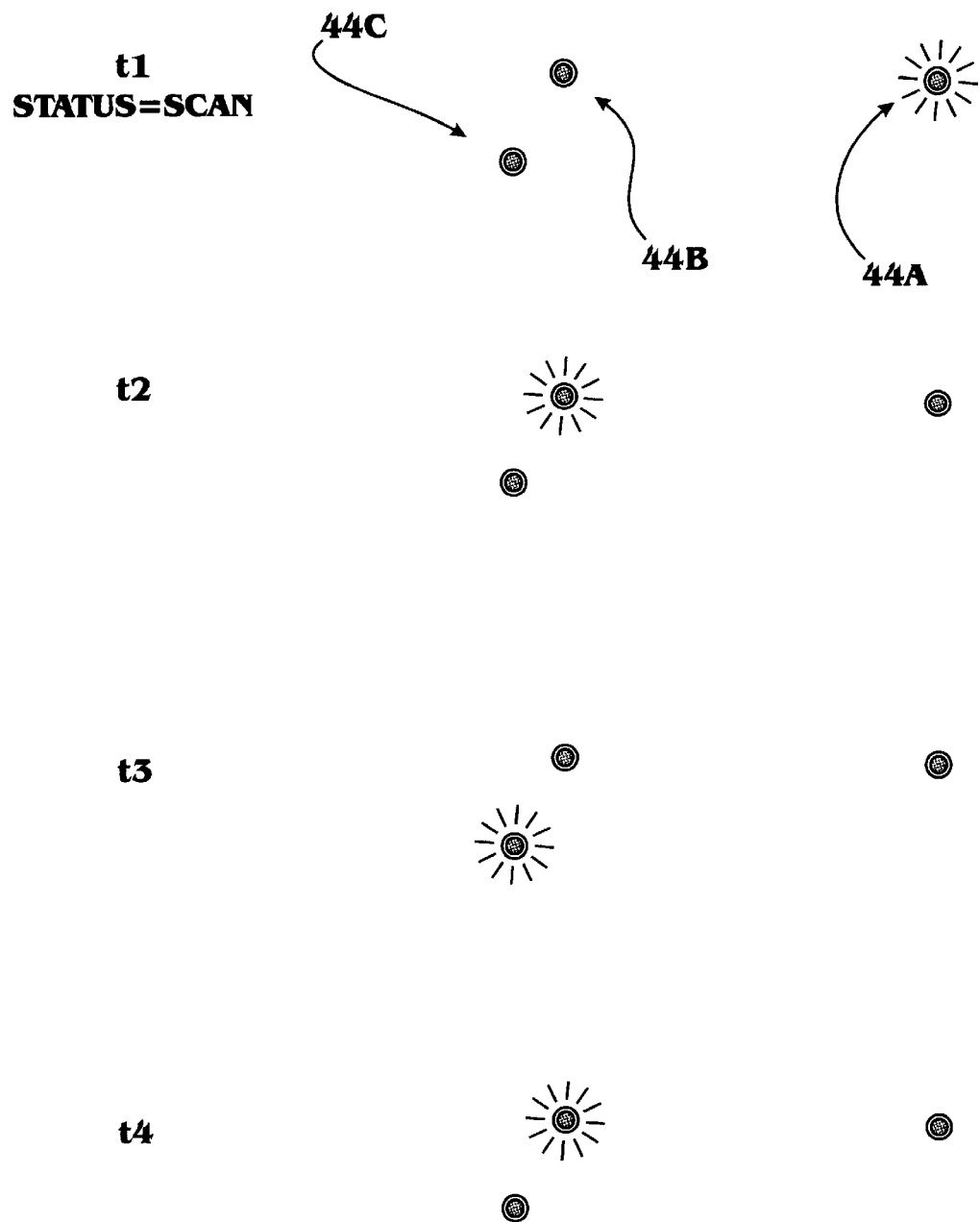
FIG. 5 is a depiction of the side light operation in "Scan" or "Normal" mode.
Figure 6:
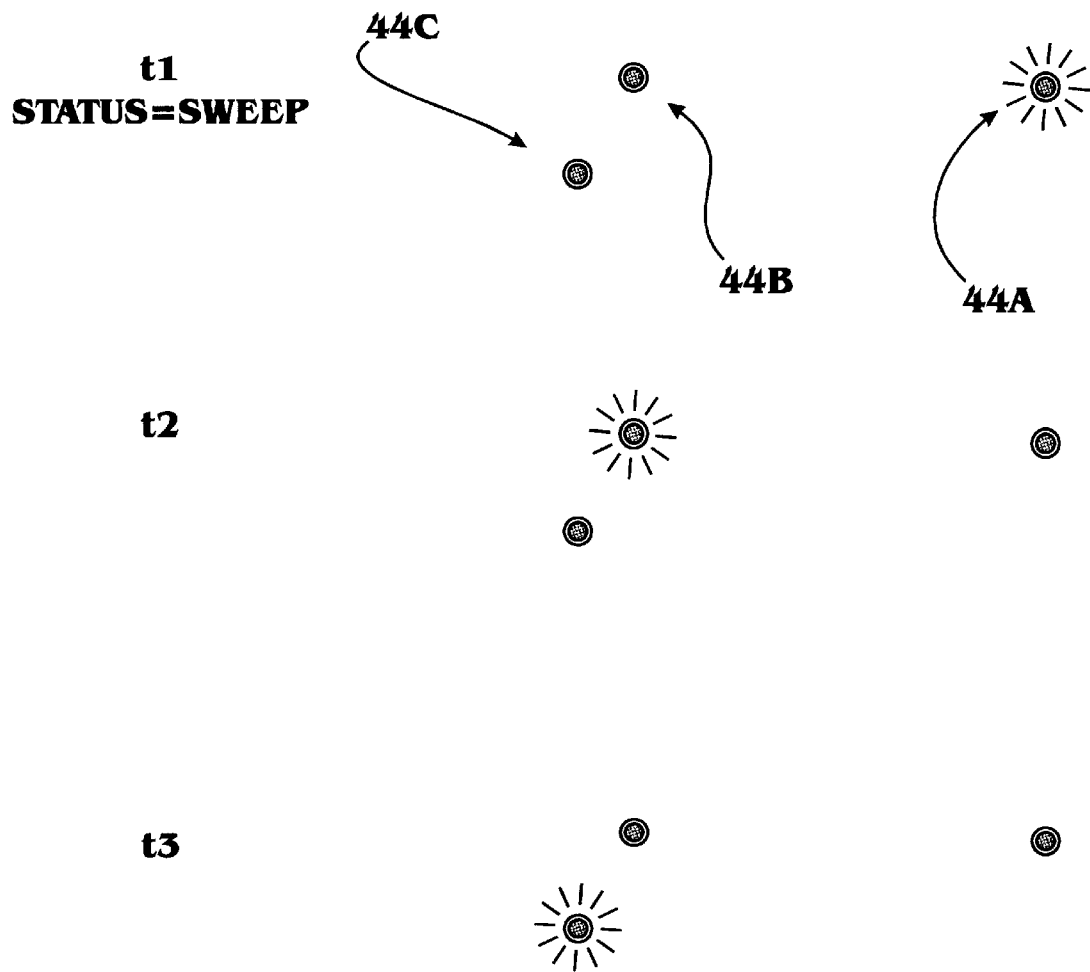
FIG. 6 is a depiction of the side light operation in "Sweep" or "Turn" mode.

The convention of the depictions of FIGS. 4–6 is to show different light configurations as they might sequentially occur when the lights 44 are flashing in a particular mode (e.g. "stop" mode or status). In this FIG. 4, the "stop" mode or lighting status is shown. As can be seen at time "t1," all three side lights 44 are illuminated. When the "stop" mode is ended, (here at time t2), the lights 44 are extinguished. If the status is switched back to "stop," the lights 44 would be illuminated once again. In another form, the lights 44 may flash continually while status="stop."

The lights 44 are typically colored LED's, however, they may also be selected from other types of conventional light-producing devices. Now turning to FIG. 5, we can examine another lighting mode for the side lights 44 of the present invention.

FIG. 5 is a depiction of the side light 44 operation in "Scan" mode. As shown, at t1 first right side light 44a is illuminated. Next, at time t2, second right side light 44b is illuminated. Next, at time t3, third right side light 44c is illuminated. Finally, at time t4, second right side light 44b is illuminated once again. Subsequently, the sequence ti–t4 is repeated until such time as the lighting status is switched to end the scan mode. In scan mode or status, then, the lights scan front-to-back-to-front until ended. We shall now turn to FIG. 6 to examine yet another lighting mode for the side lights 44 of the present invention.

FIG. 6 is a depiction of the side light 44 operation in "Sweep" mode. As shown, at t1 first right side light 44a is illuminated. Next, at time t2, second right side light 44b is illuminated. Next, at time t3, third right side light 44c is illuminated. Subsequently, the sequence t1–t3 is repeated until such time as the lighting status is switched to end the sweep mode. In sweep mode or status, then, the lights scan front-to-back (or back-to-front, if desired) until ended. We shall now turn to FIG. 7 to begin to examine the structure and function of the front and tail light array assemblies of the present invention.

Figure 7A:
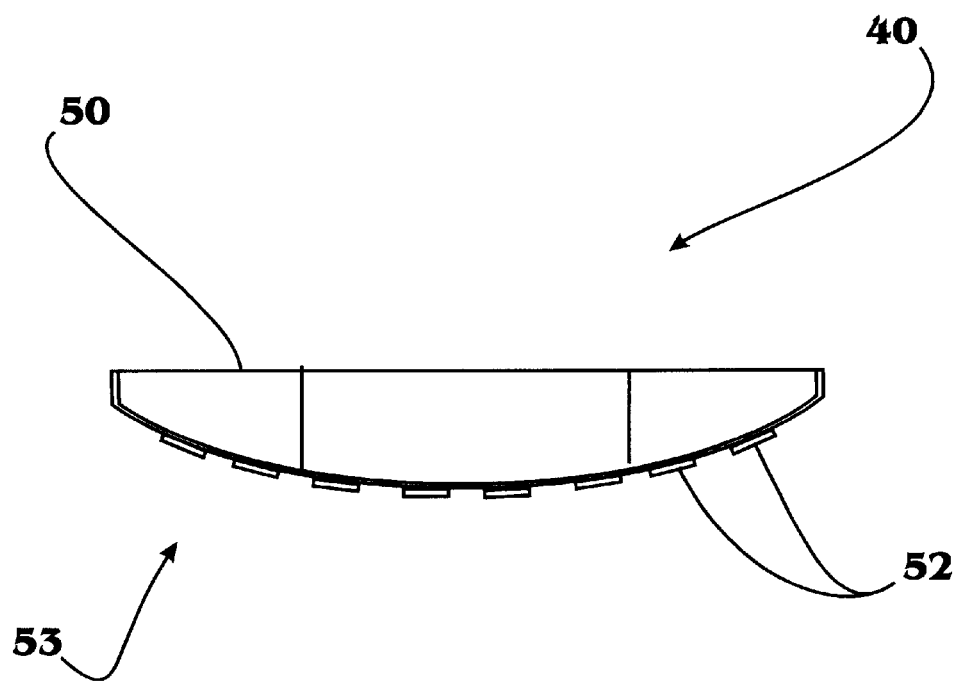
FIGS. 7A and 7B are top and front views, respectively, of an embodiment of the front light array assembly of the present invention.
Figure 7B:
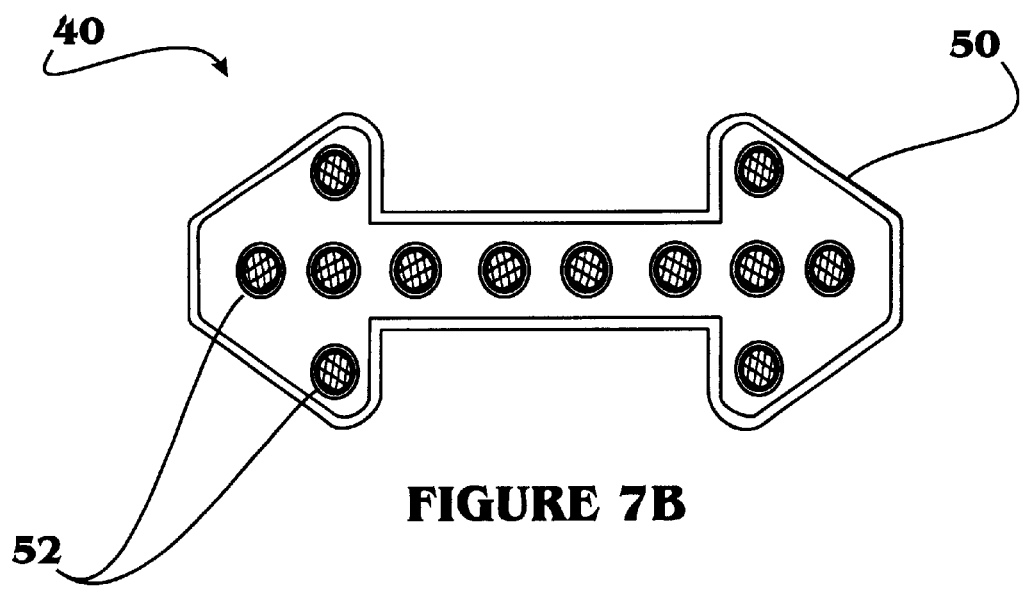

FIGS. 7A and 7B are top and front views, respectively, of an embodiment of the front light array assembly 40 of the present invention. The assembly 40 comprises a housing 50 defined by a face 53 having a plurality of lighting devices 52 disbursed thereon. The lighting devices 52 are LED's or other high-intensity light-producing devices that would be easily noticed by other vehicles' operators. The rear light array assembly (not shown) is substantially designed the same as the assembly 40 depicted here, however, the rear assembly (not shown) may comprise re-colored lighting devices. FIG. 7b depicts the sleek, aesthetically pleasing design of the assembly 40. As with the side lights, the lighting devices 52 operate in different modes that can be selected by the operator; these modes are explained below in connect with FIGS. 8 and 9.

Figure 8:
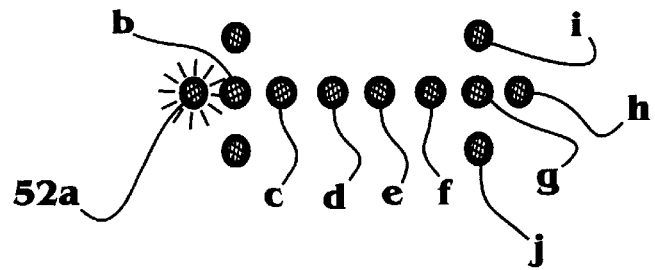
FIG. 8 is a depiction of the operation of the front light array assembly in "Left Turn" mode.
Figure 8:
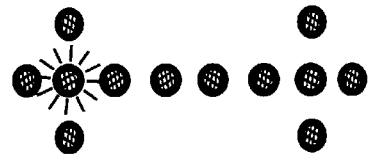
Figure 8:
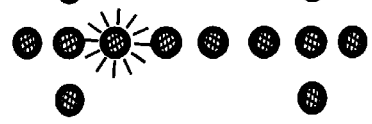
Figure 8:
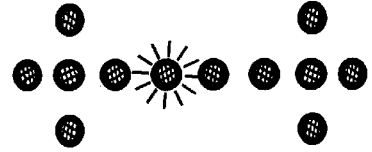
Figure 8:
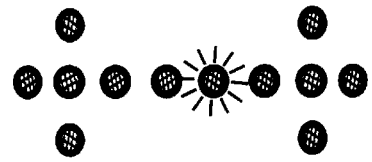
Figure 8:
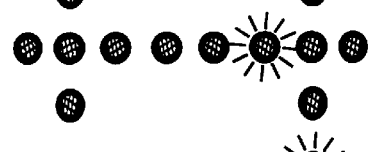
Figure 8:
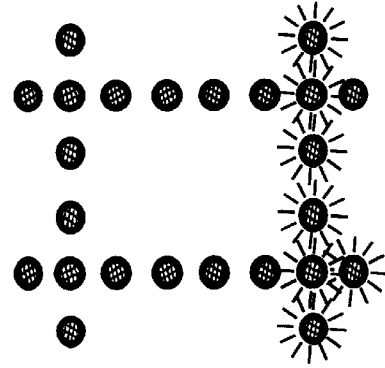

FIG. 8 is a depiction of the operation of the front light array assembly 40 in "Left Turn" mode. In this example, there are twelve lighting devices 52a–j (two are unlabeled), however in other designs, more or fewer lighting devices may be employed. Left turn mode commences with the right-most light on the right side (when facing forward on the vehicle) of the array 52a lighting. Next, at time t2, lighting device 52b illuminates. Next, at time t3, lighting device 52c illuminates. Next, at time t4, lighting device 52d illuminates. Next, at time t5, lighting device 52e illuminates. Next, at time t6, lighting device 52f illuminates. Next, at time t7, lighting devices 52g, 52i and 52j illuminate simultaneously. Finally, at time t8, lighting devices 52g, 52h, 52i and 52j illuminate simultaneously (i.e. 52h is added to the already-illuminated lighting devices). Upon completion of step time t8, steps t1–t8 are repeated until such time as the "left turn" status is terminated. The operation of the lights in this turn mode would be right-to-outside, right-to-outside.

It should be understood that the rear light array would be functioning in the mirror image to the front light array. For example, FIG. 8 could be depicting the "right turn" mode/status. Now turning to FIG. 9, we can examine another status/mode for the front and rear light assemblies.

Figure 9:
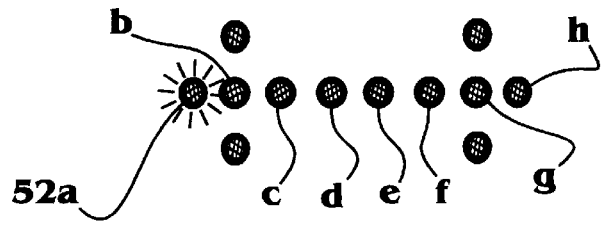
FIG. 9 is a depiction of the operation of the front light array assembly in "Normal" mode.
Figure 9:
Figure 9:
Figure 9:
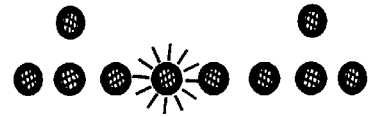
Figure 9:
Figure 9:
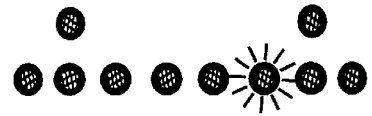
Figure 9:
Figure 9:

FIG. 9 is a depiction of the operation of the front light array assembly 40 in "Normal" or "Scanning" mode. As can be seen, the lights 52a–52h are illuminated one at a time from t1 to t8, until all lights have been illuminated. The successive illumination then reverses, namely, lights 52g–52a are successively lighted one at a time. Subsequently, status t2–t8 is repeated. The effect of this lighting operation is to sweep from left to right and back again until normal status is ended. Although they are not depicted, there is an additional "stop" mode/status. The stop mode/status results in all of the lighting devices 52 illuminating and then turning off simultaneously (i.e. flashing). Now turning to FIG. 10, we can examine yet another embodiment of the present invention.

Figure 10:
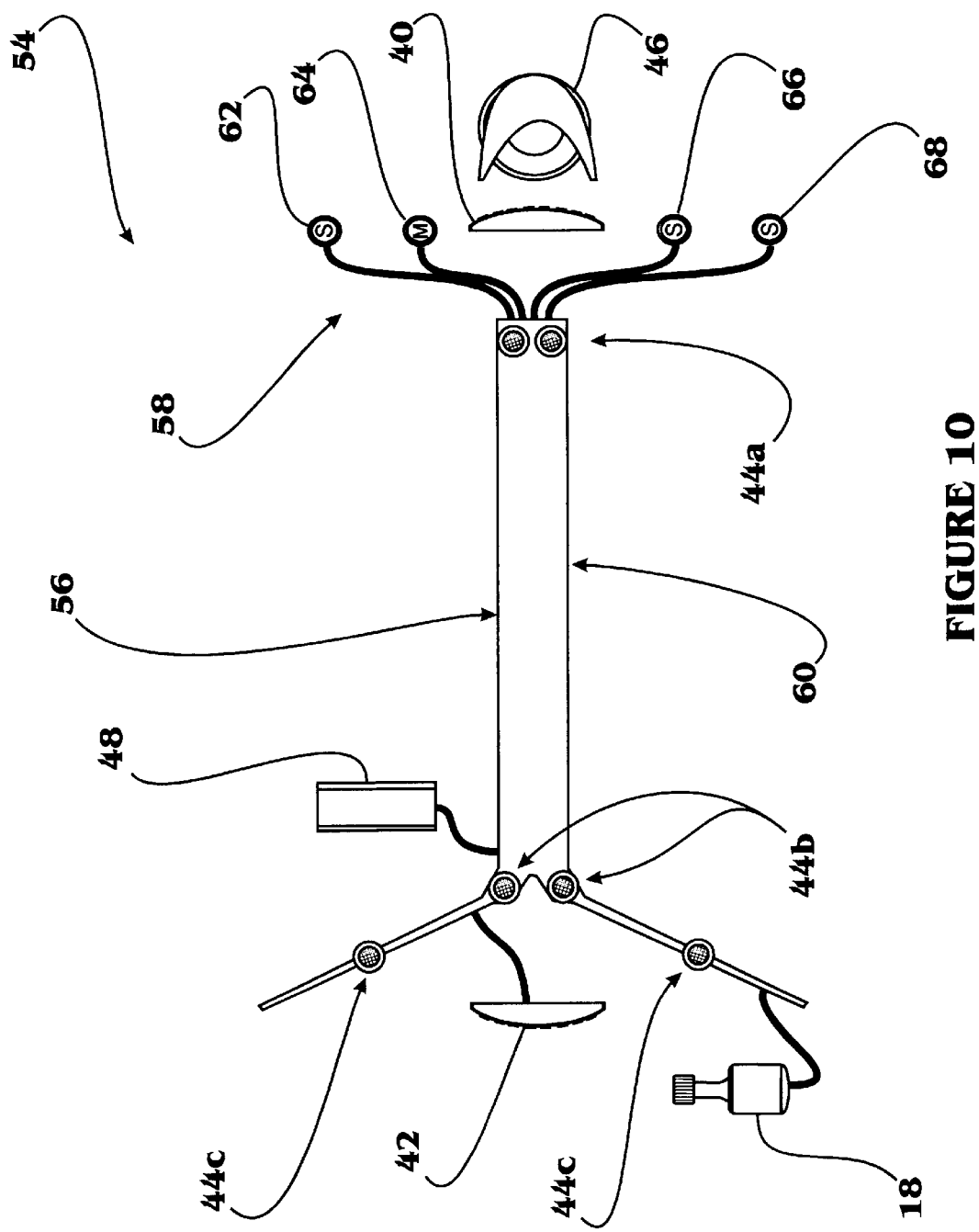
FIG. 10 is a Vehicle Safety and Comfort System Kit.
Figure 11:
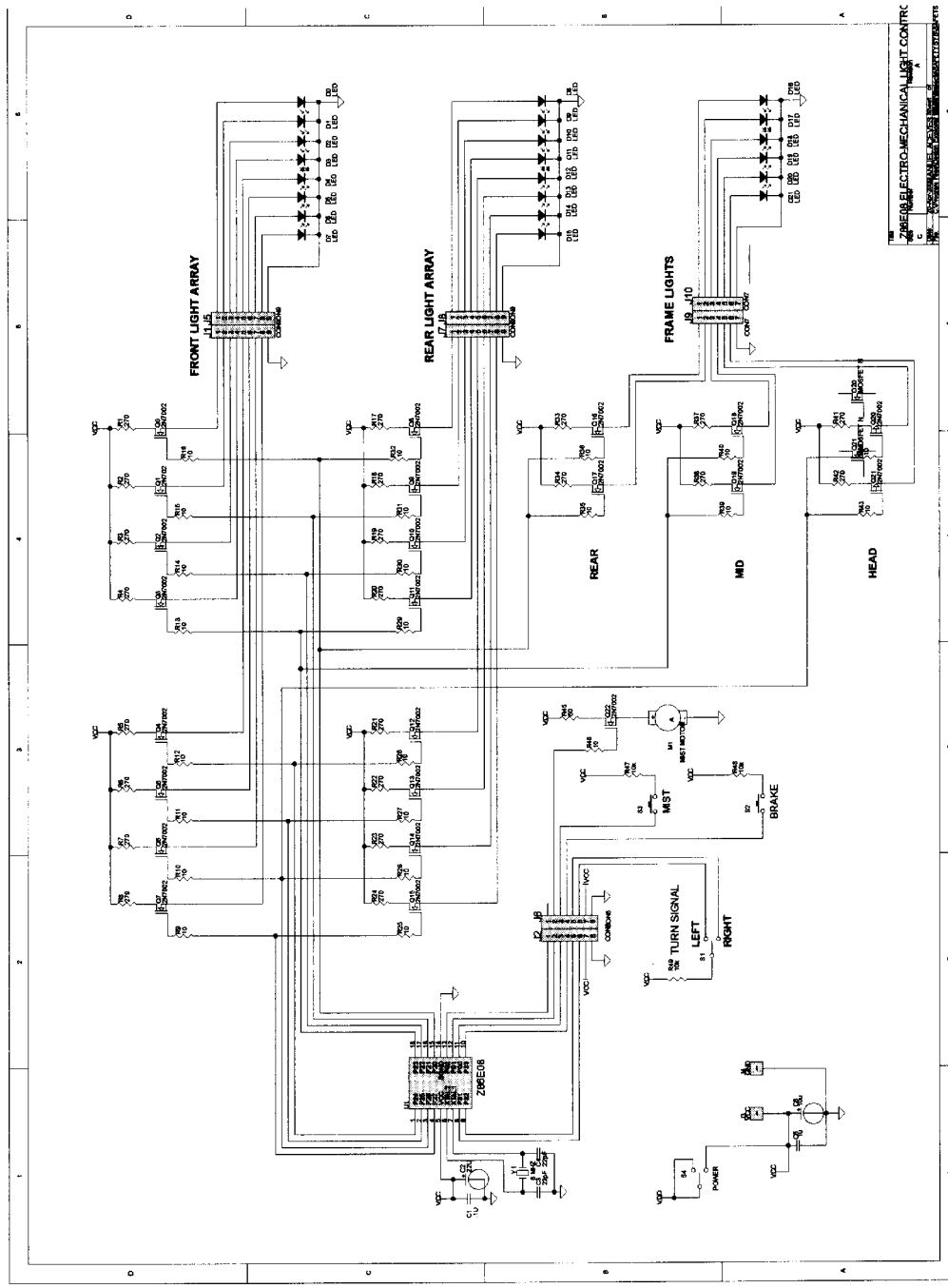
FIG. 11 is a circuit diagram for one embodiment of the present invention.

FIG. 10 is a Vehicle Safety and Comfort System Kit 54, for installation on existing bicycle. The kit 54 operates in essentially the same fashion as previously discussed above in connection with FIGS. 3–9, but further includes the novel aspect of having its electrical wiring leads formed into a flexible circuit mat 56. The flexible circuit mat 56 is designed to mat a variety of different bicycle styles, shapes and models. It is made from a flexible material having electrical wire traces encased therein. The mat 56 further comprises either a magnetic or adhesive layer on its back side. The magnetic/adhesive layer is provided to securely attach the mat 56 to the frame of the bicycle. Once attached to the bicycle, the mat 56 is designed so that the side lights 44 are displayed in the appropriate locations (as discussed above).

Also attached to, and extending from the mat 56 are all of the components previously discussed (the side lights 44, the light array assemblies 40 and 42, the misting system 46, the control unit 48, and the generator 18). These components are each attached to the flexible circuit mat 56 via a plurality of flexible connection leads 58 that further may include strain relief loops; these flexible connection leads 58 are conventional service loops. In other embodiments, these service loops may be implemented through water-proof encapsulated connectors.

Also depicted in this FIG. 10 are a turn signal manual switch 62 for activating and deactivating the turn light modes/status, the mist manual switch 66 for activating and deactivating the misting system 46, and the brake manual switch 68 for activating and deactivating the stop mode/status. Furthermore, the optionally-provided microphone device 64 is provided here for accepting voice commands to activate the functionality of the system devices without using the manual switches. The voice commands received by the microphone device 64 would be interpreted and acted upon by the control unit 48.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A vehicle safety and comfort system kit, comprising:
    a flexible circuit mat defined by a back side, wiring leads and an insulating cover;
    an adhesive layer on said back side;
    a plurality of side lights disbursed on said mat, said lights in electrical contact with said wiring leads;
    a front light array assembly in electrical contact with said wiring leads;
    an electrical power source in electrical contact with said wiring leads; and
    a control unit for activating said side lights.

2. The kit of claim 1, wherein said side lights and said control unit cooperate to define a plurality of operational modes, one said mode comprising a stop mode.

3. The kit of claim 2, wherein said operational modes further comprise a scan mode.

4. The kit of claim 3, wherein said front light array assembly further cooperates with said control unit to define a plurality of operational modes, one said mode comprising a normal mode.

5. The kit of claim 4, wherein said front light array assembly operational modes further comprise left and right turn modes.

6. The kit of claim 4, further comprising a rear light array assembly, said rear light array assembly cooperating with said control unit to define a plurality of operational modes, one said mode comprising a normal mode.

7. The kit of claim 6, wherein said rear light array assembly operational modes further comprise left and right turn modes.

8. The kit of claim 1, further comprising a misting system in electrical contact with said wiring leads.

9. A bicycle and safety and comfort system combination, the combination comprising:
    a bicycle defined by a frame, said frame defining a head tube, a top tube, a seat tube and a pair of seat stays;
    a flexible circuit mat defined by a back side, wiring leads and an insulating cover, said back side attached to said bicycle;
    a plurality of side lights disbursed on said mat, said lights in electrical contact with said wiring leads;
    a front light array assembly in electrical contact with said wiring leads;
    an electrical power source in electrical contact with said wiring leads; and
    a control unit for activating said side lights.

10. The combination of claim 9, wherein said side lights and said control unit cooperate to define a plurality of operational modes, one said mode comprising a stop mode.

11. The combination of claim 10, wherein said operational modes further comprise a scan mode.

12. The combination of claim 11, wherein said front and rear light array assemblies further cooperate with said control unit to define a plurality of operational modes, one said mode comprising a normal mode.

13. The combination of claim 12, wherein said front and rear light array assembly operational modes further comprise left and right turn modes.

14. The kit of claim 9, further comprising a misting system in electrical contact with said wiring leads.

15. A bicycle comprising:
a bicycle defined by a frame, said frame defining a head tube, a top tube, a seat tube and a pair of seat stays;
a plurality of side lights disbursed on said frame,
one or more wiring leads running along said frame, said lights in electrical contact with said wiring leads;
a front light array assembly in electrical contact with said wiring leads;
an electrical power source in electrical contact with said wiring leads; and
a control unit for activating said side lights.

16. The kit of claim 15, further comprising a misting system in electrical contact with said wiring leads.

17. The bicycle of claim 16, wherein said side lights and said control unit cooperate to define a plurality of operational modes, one said mode comprising a stop mode.

18. The bicycle of claim 17, wherein said operational modes further comprise a scan mode.

19. The bicycle of claim 18, wherein said front and rear light array assemblies further cooperate with said control unit to define a plurality of operational modes, one said mode comprising a normal mode.

20. The bicycle of claim 19, wherein said front and rear light array assembly operational modes further comprise left and right turn modes.

* * * * *